(12) United States Patent
Loncle et al.

(10) Patent No.: US 7,410,630 B2
(45) Date of Patent: Aug. 12, 2008

(54) METHOD AND AN INSTALLATION FOR OBTAINING CARBON BODIES FROM CARBON-PRECURSOR BODIES

(75) Inventors: Jean-Etienne Loncle, Le Haillan (FR); Pascal Pothier, Le Pian Medoc (FR)

(73) Assignee: Snecma Propulsion Solide, Le Haillan (FR)

(*) Notice: Subject to any disclaimer, the term of this patent is extended or adjusted under 35 U.S.C. 154(b) by 632 days.

(21) Appl. No.: 10/256,223

(22) Filed: Sep. 26, 2002

(65) Prior Publication Data

US 2004/0008750 A1 Jan. 15, 2004

(30) Foreign Application Priority Data

Jul. 12, 2002 (FR) .................................. 02 08821

(51) Int. Cl.
*D01F 9/12* (2006.01)

(52) U.S. Cl. .................. 423/447.8; 423/447.1; 423/460

(58) Field of Classification Search ............. 423/447.1, 423/447.8, 460, 461; 264/29.1, 29.2, 29.6, 264/29.7; 134/22.1–24
See application file for complete search history.

(56) References Cited

U.S. PATENT DOCUMENTS

| | | | | |
|---|---|---|---|---|
| 4,001,382 | A | * | 1/1977 | Matsumura et al. ....... 423/447.1 |
| 4,238,244 | A | * | 12/1980 | Banks ...................... 134/22.18 |
| 4,349,523 | A | * | 9/1982 | Hiramatsu et al. ....... 423/447.4 |
| 5,154,776 | A | * | 10/1992 | Bloch ........................ 134/22.1 |
| 5,614,134 | A | | 3/1997 | Sohda et al. ................ 264/29.1 |
| 6,455,160 | B1 | * | 9/2002 | Hiraoka et al. .............. 428/408 |
| 6,638,883 | B2 | * | 10/2003 | Gaffney et al. .............. 442/181 |
| 2001/0051127 | A1 | * | 12/2001 | Morita et al. ................ 423/460 |
| 2003/0100239 | A1 | * | 5/2003 | Gaffney et al. .............. 442/354 |
| 2004/0009113 | A1 | * | 1/2004 | Sion ......................... 423/447.1 |

FOREIGN PATENT DOCUMENTS

GB          2 148 866 A       6/1985

* cited by examiner

*Primary Examiner*—Stuart Hendrickson
*Assistant Examiner*—Daniel C. McCracken
(74) *Attorney, Agent, or Firm*—Weingarten, Schurgin, Gagnebin & Lebovici LLP

(57) ABSTRACT

The method comprises a first stage of transforming carbon precursor material into carbon by heating, with the resulting gaseous effluent being extracted continuously, and a second stage of high temperature heat treatment under low pressure with the resulting gaseous effluent being extracted continuously. The first and second stages are performed one after the other in the same oven by proceeding, after the end of the first stage, with the steps of switching the gaseous effluent outlet from the oven to interrupt a connection with a first extractor device and to establish a connection with a second extractor device, of adjusting the pressure inside the oven to the value required for the second stage, and of adjusting the heating temperature of the oven starting from the temperature reached at the end of the first stage. It is also possible to switch temperature measurement from at least one first sensor to at least one second sensor different from the first. During the second stage, any alkali metal such as sodium contained in sublimed form in the gaseous effluent coming from the oven can be neutralized, e.g. by injecting $CO_2$ into an effluent exhaust pipe.

11 Claims, 2 Drawing Sheets

METHOD AND AN INSTALLATION FOR OBTAINING CARBON BODIES FROM CARBON-PRECURSOR BODIES

BACKGROUND OF THE INVENTION

The invention relates to making carbon bodies from bodies made of carbon-precursor material.

A particular field of application of the invention lies in making carbon fiber fabrics or preforms for use in constituting fiber reinforcement for parts made of thermostructural composite material such as carbon/carbon (C/C) composite and carbon-reinforced ceramic matrix composite. Such carbon fiber preforms are conventionally obtained from carbon-precursor fiber fabrics which are better at withstanding the textile operations required for shaping said fabrics than are carbon fibers.

Amongst carbon precursors, in particular precursors in the form of fibers, preoxidized polyacrylonitrile (PAN) is commonly used. At least for certain uses, it is necessary not only to transform preoxidized PAN fiber fabric into carbon, but also to eliminate any metals or metallic impurities that come from the precursor, i.e. mainly sodium. That is why carbon bodies are usually made from preoxidized PAN carbon-precursor bodies in two successive stages:

a first stage of carbonization proper in which the carbon precursor is transformed chemically into carbon, with this being performed on an industrial scale in an oven by progressively raising the temperature to which the oven is heated to about 900° C.; and a second stage of heat treatment at high temperature, this treatment likewise being performed in an oven, with the temperature being raised progressively to above 1000° C., generally to a temperature in the range 1400° C. to 1650° C., so as to eliminate sodium by sublimation, or indeed to very high temperature, up to 2000° C. or 2200° C., or even 2500° C. so as to confer particular properties on the carbon fibers and so as to eliminate any other metallic impurities.

During the first stage, generally performed substantially at atmospheric pressure while sweeping with an inert gas such as nitrogen, transformation of the precursor is completed so as to achieve a carbon content greater than 95% and possibly as much as 99% or more. The loss of mass is large, being about 50%, and it is accompanied by the production of a large volume of gaseous effluent, which effluent contains in particular nitrites, specifically cyanides, which must be treated.

The second stage is performed under low pressure, likewise while being swept with an inert gas such as nitrogen or argon. The flow rates of the sweeping gas and of the gaseous effluent are much lower than during the first stage.

The two stages are implemented in appropriate different installations. On an industrial scale, each of these stages lasts for several days. The process of obtaining carbon bodies without sodium starting from preoxidized PAN carbon precursor is therefore lengthy and expensive.

The same problems are encountered with carbon-precursor fibers other than preoxidized PAN and likewise containing sodium or other metals such as magnesium or calcium that need to be eliminated, and also when it is necessary to eliminate metals or metallic impurities such as iron, nickel, or chromium, for example, which require heat treatment at high temperature, typically up to 2000° C. and more in order to enable them to be eliminated by evaporation.

OBJECT AND SUMMARY OF THE INVENTION

An object of the invention is to provide a method and an installation enabling carbon bodies to be obtained while making very significant savings in terms of cost and duration.

This object is achieved by a method of the type comprising:

a first stage in which the carbon precursor material is transformed into carbon by heating, with the resulting gaseous effluent being extracted continuously; and a second stage of high temperature heat treatment under low pressure with the resulting gaseous effluent being continuously extracted, in which method, according to the invention, the first and second stages are performed one after another in the same oven by proceeding, after the end of the first stage, with the following steps:

switching the gaseous effluent outlet from the oven to interrupt a connection with a first extractor device used during the first stage and to establish a connection with a second extractor device used during the second stage;

adjusting the pressure inside the oven to the low pressure value required for the second stage; and adjusting the heating temperature of the oven starting from the temperature reached at the end of the first stage.

In an implementation of the invention, after the first stage has been finished, measurement of the heating temperature of the oven is switched from at least one first temperature sensor to at least one second sensor that is different from the first. The or each first sensor can be a sensor of the thermocouple type which is housed in the oven close to a wall thereof, and it is sacrificed under the effect of temperature during the second stage. It can be necessary during the first stage to use a thermocouple type of temperature sensor because the large amount of gaseous effluent given off makes it impossible to use a sensor such as an optically-aimed pyrometer which is suitable for use during the second stage.

This switching over from one temperature measurement means to another can also be accompanied by changing the configuration of heating zones inside the oven.

Advantageously, the switchover between the first and second gaseous effluent extractor devices and also between the first and second measurement sensor(s) is automated.

Since the second stage is performed under low pressure, it is useful to leak-test the oven in order to avoid any air penetrating through a leak which could lead to the carbon body being corroded by oxidation during the second stage of the method. In an implementation of the method, the oven is leak-tested prior to the first stage. Leak-testing can comprise, in particular, sweeping the inside volume of the oven with an inert gas such as nitrogen, and measuring the quantity of gaseous oxygen contained in the gas sweeping through the oven after it has been loaded.

During the first stage, heating is implemented to reach a temperature that is high enough to carbonize the precursor completely or almost completely, but below a threshold at which one or more metals or metallic purities contained in the precursor sublime or evaporate, and indeed below a threshold at which temperature sensors housed inside the oven are destroyed. This temperature preferably lies in the range 750° C. to 1100° C., and is typically close to 900° C.

During the second stage, heating is implemented at a temperature which is high enough to sublime or evaporate one or more metals or metallic impurities that are to be eliminated and/or optionally to confer particular properties to the resulting carbon bodies. When sodium is to be eliminated, this temperature is higher than 1000° C., generally lying in the range 1400° C. to 1650° C., and typically close to 1600° C. When other metals such as iron, nickel, or chromium need to be eliminated, this temperature may reach 2000° C. or 2200° C., or even 2500° C. The maximum temperature may be restricted to below a threshold above which the resulting carbon body is subjected to transformation of a kind that will alter its properties, for example spoiling the mechanical and thermal properties of carbon fibers, or on the contrary it can be selected to be higher than such a threshold in order specifically to modify said properties. The second stage is performed under low pressure, advantageously below 50 kilopascals (kPa), for example under a pressure lying in the range 0.1 kPa to 50 kPa, and preferably below 5 kPa.

In an implementation of the method, when the gaseous effluent extracted from the oven during the second stage contains at least one alkali metal such as Na for example, said alkali metal is neutralized by injecting a neutralizing agent into an effluent exhaust pipe. This neutralization can be performed by passivation by injecting carbon dioxide ($CO_2$) into the gaseous effluent, or by hydration by injecting steam ($H_2O$), or indeed by injecting a mixture of $CO_2+H_2O$.

Advantageously, this neutralization is performed continuously by injecting the neutralizing agent into the stream of gas and effluent that flows along the exhaust pipe.

The method of the invention is particularly advantageous because of the reduction it makes possible in the duration and thus the cost of treatment in comparison with the prior art method that is implemented in two separate stages in two different ovens, with intermediate cooling, and this applies in spite of the facts that:

the oven is loaded in non-optimum manner during the second stage because of the large reduction in the volume of the body(ies) once carbonized; and one or more of the temperature sensors used during the first stage are optionally sacrificed.

Another object of the present invention is to provide an industrial installation enabling the method to be implemented.

This object is achieved by an installation of the type comprising an oven, means for heating the oven, at least one sensor for measuring the heating temperature of the oven, a control circuit connected to the temperature-measuring sensor and to the heater means in order to control the heating temperature of the oven, at least one inlet for sweeping gas to sweep the inside volume of the oven, at least one outlet for extracting gaseous effluent from the oven, and at least one extractor device connected to the gaseous effluent outlet, which installation, according to the invention, further comprises:

a first gaseous effluent extractor device for receiving a gaseous effluent produced during the transformation of the precursor material into carbon by heating within the oven;

a second gaseous effluent extractor device for receiving a gaseous effluent produced by heat treatment at high temperature in the oven after the precursor material has been transformed; and switch means enabling the oven to be connected selectively to the first or the second extractor device.

In a particular embodiment, the installation further comprises:

at least one first temperature sensor housed in the oven to deliver information representative of the heating temperature while the precursor material is being transformed into carbon; and at least one second temperature sensor for supplying information representative of the heating temperature during the high temperature heat treatment after the precursor has been transformed.

The or each first sensor is preferably a thermocouple sensor housed in a casing, e.g. in the form of a stick, placed close to a wall of the oven and made of a refractory material, such as graphite. The stick performs a confinement function which serves to avoid disturbances to temperature measurements, and subsequently serves to avoid polluting the atmosphere of the oven with the products that result from one or more thermocouple sensors being destroyed during the heat treatment at high temperature. The or each second sensor is preferably an optically-aimed pyrometer.

In a particular embodiment of the installation, the second extractor device has an effluent exhaust pipe connected to an outlet from the oven and means for injecting at least one neutralizing agent into the exhaust pipe close to the outlet of the oven, the agent serving to neutralize one or more substances contained in the effluent, and in particular one or more metals.

In an embodiment, the installation comprises first and second circuits for feeding the oven with inert sweeping gas and switch means for connecting the oven selectively to the first feed circuit or to the second.

Advantageously, a measuring device is also provided, which device is connected to the inside volume of the oven and is suitable for providing a measurement of the quantity of oxygen contained in an inert gas such as nitrogen that is sweeping the oven.

BRIEF DESCRIPTION OF THE DRAWINGS

The invention will be better understood on reading the following description given by way of non-limiting indication and made with reference to the accompanying drawings, in which.

DETAILED DESCRIPTION OF AN EMBODIMENT

Figure 1:
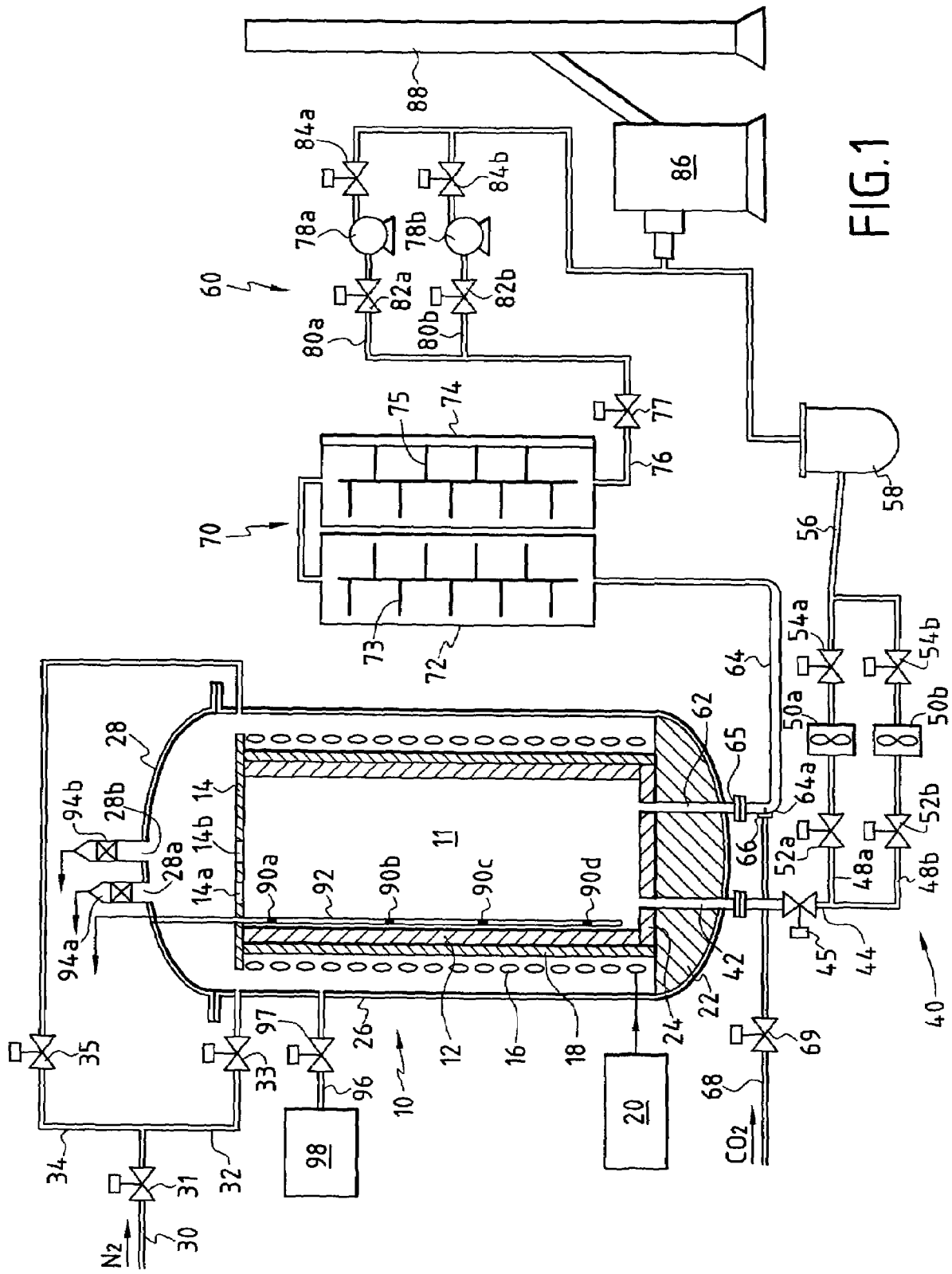
FIG. 1 is a highly diagrammatic overall view of an installation constituting an embodiment of the invention.

FIG. 1 is a highly diagrammatic representation of an oven 10 comprising a susceptor 12 in the form of a vertical axis cylinder defining the sides of a volume or enclosure 11 for filling with bodies (not shown) made of a carbon-precursor material, for example pieces of fabric made of preoxidized PAN fiber. The susceptor is surmounted by a cover 14.

The susceptor 12, which is made of graphite for example, is heated by inductive coupling with an induction coil 16 which surrounds the susceptor, with thermal insulation 18 being interposed between them. The induction coil is powered by a control circuit 20 which delivers electricity as a function of the heating requirements of the oven.

The induction coil can be subdivided into a plurality of sections along the vertical dimension of the oven. Each section is individually powered with electricity so as to define different heating zones within the oven, in which zones temperature can be regulated independently.

The bottom of the oven is formed by a thermal insulator 22 covered by an oven soleplate 24, e.g. made of graphite and having the susceptor 12 standing thereon.

The assembly is housed in a casing 26, e.g. made of metal and closed in leaktight manner by a removable cover 28.

A duct 30 having a valve 31 is connected to a source of inert gas (not shown), e.g. a source of argon, or in this example of nitrogen $N_2$. The duct 30 is connected to two circuits 32 and 34 for feeding the oven 10 with inert sweeping gas, said circuits being designed respectively to feed gas at a low flow rate and at a high flow rate. Each circuit 32, 34 comprises a duct fitted with a flow rate regulating valve respectively referenced 33, 35. The circuits 32, 34 open out to the inside of the oven 10 in the top portion thereof. The circuit 32, and possibly also the circuit 34, may be connected to a plurality of inlets opening out at different locations around the casing 26 of the oven.

Two extractor devices 40 and 60 are connected to respective outlet pipes 42 and 62 from the oven and passing through the bottom thereof.

The device 40 is designed to extract the gaseous effluent produced while transforming the carbon precursor into carbon. It is connected to the outlet 42 by a pipe 44 fitted with a valve 45.

Ducts 48a and 48b having respective fans 50a and 50b mounted therein are connected in parallel between the pipe 44 and a pot 58 for collecting nitrites, mainly heavy nitrites contained in the gaseous effluent that condense in liquid form. Valves 52a, 52b and 54a, 54b are mounted in the ducts 48a and 48b upstream and downstream from the fans 50a and 50b in order to enable the fans to be put into circuit or isolated selectively. Although it is possible to use only one fan, the presence of two fans which can be put into operation selectively is preferred for reasons of redundancy and/or, if necessary, to increase the extraction flow rate. To provide additional security, an automatic valve can be connected in parallel with the fans to open when the pressure in the pipe 44 becomes higher than atmospheric pressure, and to close when the pressure in the pipe 44 drops back to or below atmospheric pressure, so as to prevent air penetrating into the oven.

The duct 56 which connects the pipes 48a and 48b in common to the pot 58 may slope slightly. The pot 58 is provided with a rinsing circuit (not shown) enabling the pot to be cleaned in a closed circuit.

The device 60 serves to extract the gaseous effluent produced during heat treatment performed at high temperature after the bodies made of carbon precursor have been carbonized. Such treatment seeks in particular to eliminate metals initially contained in the carbon precursor, and specifically residual sodium. The device essentially comprises a vertical shaft having baffle plates 70 and a suction device 80.

Figure 2:
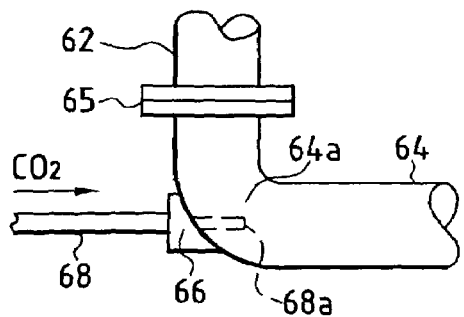
FIG. 2 is a detail view showing a portion of the device for extracting gaseous effluent from the oven in the FIG. 1 installation.

The device 60 is connected to the outlet 62 via a pipe 64 having an inlet 66 for injecting carbon dioxide $CO_2$. As shown in detail in FIG. 2, the pipe 64 forms a bend 64a at its end which is connected via a flange 65 to the outlet duct 62 that passes through the bottom of the oven. The injection inlet 66 is connected to a duct 68 which is in turn connected to a source of $CO_2$ gas (not shown), and it is provided with a valve 69. The duct 68 is extended by a nozzle 68a which penetrates into the pipe 64 so as to inject the $CO_2$ gas into the pipe towards the downstream end of the bend 64a, thereby avoiding any accidental injection of $CO_2$ gas into the oven via the outlet duct 62.

The device 70 serves to trap solids contained in the gaseous effluent conveyed by the pipe 64. It comprises two columns 72 and 74 provided with plates 73 and 75 which constrain the gas to follow a tortuous path and which are connected in series between the pipe 64 and a duct 76 having a valve 77.

The suction device 80 comprises pumps 78a and 78b mounted in respective ducts 80a and 80b connected in parallel between the ducts 76 and a burner 86. Valves 82, 82b and 84a, 84b are mounted in the ducts 80a and 80b upstream and downstream from the pumps 78a and 78b so as to enable them to be put into circuit or isolated selectively. The pumps 78a and 78b serve to establish a desired low pressure level inside the oven. Although it is possible to use only one pump, having two pumps is preferred for reasons of redundancy.

The burner 86 whose inlet is also connected to the outlet from the nitrile pot 58 feeds a chimney 88.

The oven 10 is fitted with temperature sensors connected to the control circuit 20 for the purpose of adjusting the heating temperature to the desired value.

A first series of sensors used while transforming the carbon precursor is constituted by a plurality of thermocouple sensors, e.g. four sensors 90a, 90b, 90c, and 90d placed at different levels close to the inside face of the susceptor 12. Although it is not necessary to use a plurality of sensors, it is preferable so as to be able to define a plurality of heating zones within the oven. The temperature in each zone is then regulated independently by controlling the power supply to a corresponding section of the induction coil on the basis of temperature information supplied by the sensor associated with said heating zone, the induction coil then being subdivided into four sections. One or more additional thermocouple sensors may be provided for redundancy purposes. It should be observed that the sensors 90a, 90b, 90c, and 90d provide information representative of the heating temperature, i.e. the temperature of the wall of the susceptor 12, and not the temperature of the bodies being carbonized.

Figure 3:
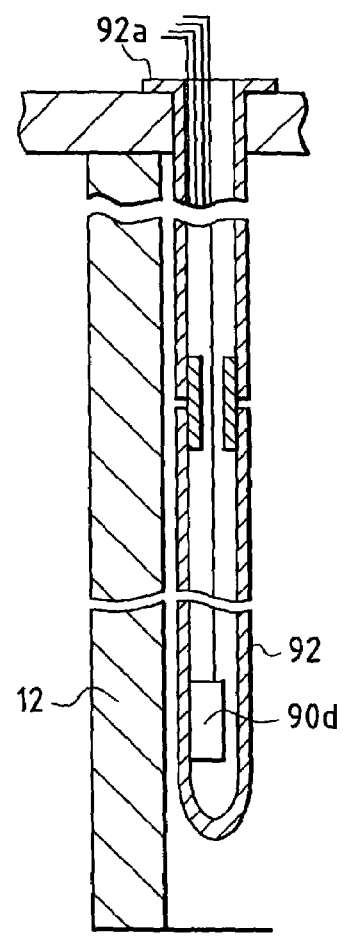
FIG. 3 is a detail view showing the temperature sensors placed inside the oven of the FIG. 1 installation.

The sensors 90a, 90b, 90c, and 90d are housed inside a hollow stick 92 (FIGS. 1 and 3) whose inside volume is isolated from that of the oven. The stick 92 can be made up of a plurality of segments or modules that are assembled end to end by screw connections, and it can be suspended from the cover 14 of the susceptor. The conductors connecting the sensors 90a, 90b, 90c, and 90d to the outside and to the circuit 20 extend along the inside volume of the stick 92.

The stick 92 serves to confine the temperature sensors. As a result, temperature measurement is not disturbed, in particular by the presence of strong flows of gas within the oven. In addition, as mentioned below, this also makes it possible to collect the products that result from the sensors being destroyed when the temperature is subsequently raised beyond the maximum temperature they can withstand. The stick must be made of a refractory material that has low porosity, that is capable of withstanding the decomposition gases produced by the carbon precursor and by the products of the thermocouples melting, and that is relatively easy to machine. By way of example, fine-grained graphite can be used with a wall thickness of about 10 millimeters (mm) to 15 mm, for example. Making the stick as a connection of modules facilitates assembly and disassembly and also facilitates replacement of defective portions. At its top end, the stick 92 passes through the cover 14 and rests against it via a shoulder 92a, thus enabling the stick to be positioned easily and accurately.

Other sensors, for example two sensors 94a and 94b constituted by optically-aimed pyrometers are received on the cover 28 to look through windows 28a and 28b formed through said cover and also through openings 14a and 14b formed through the cover 14 of the susceptor. Although it is not essential to use a plurality of pyrometer sensors, the use of a plurality makes it possible to perform measurements at different levels and to eliminate possible erroneous measurements by making comparisons. It is preferable to use pyrometers of the bichromatic type producing a continuous signal that is constantly available.

Finally, there can be seen an additional outlet 96 provided with a valve 97 through the side of the oven wall for the purpose of feeding an oxygen analyzer 98. In a variant, the analyzer could be connected to another outlet duct from the oven, for example to the pipe 44.

The above-described installation serves to perform the following stages one after the other and without intermediate cooling:
- a first stage of transforming pieces of preoxidized PAN fiber fabric into carbon-fiber preforms, the preoxidized PAN being transformed while being swept with $N_2$, at a pressure that is close to atmospheric pressure, with the heating temperature following a predetermined temperature rise profile up to a temperature lying in the range 750° C. to 1100° C., and typically about 900° C.; and
- a second stage formed while sweeping with $N_2$ under low pressure lying in the range 0.5 kPa to 10 kPa, and typically about 1 kPa to 5 kPa, while following a predetermined temperature rise profile up to a temperature greater than 1000° C., lying in the range 1400° C. to 1650° C., and typically about 1600° C., in order to eliminate sodium contained in the carbon-fiber preforms, and which can be as high as 2000° C. or 2200° C. or even 2500° C. in order also to eliminate other metallic impurities by sublimation or evaporation and/or in order to modify the properties of the carbon fibers constituting the preforms.

The maximum temperature during the first stage is selected to be high enough to ensure that the preoxidized PAN is carbonized completely or almost completely. It is lower than the thresholds above which metals or metallic impurities, in particular Na, are sublimed at the pressure at which the first stage is performed, and below the threshold at which the thermocouple temperature sensors run the risk of being destroyed. The maximum temperature during the second stage is selected to be high enough to ensure that the metals or metallic impurities for elimination, and in particular Na, sublime or evaporate under low pressure. In certain cases, it is preferably not to exceed a threshold above which the mechanical properties of carbon fibers run the risk of being altered. When the carbon fibers are obtained from preoxidized PAN carbon precursor, such a threshold lies at about 1650° C. or a little higher. In other cases, on the contrary, this threshold is exceeded, specifically for the purpose of modifying properties of the carbon fibers.

Because the second stage is performed under low pressure, it is desirable to leak-test the oven once it has been loaded and closed. This cannot be performed at the end of the first stage by using conventional means since the temperature inside the oven is high.

Consequently, leak-testing is performed at the beginning of the process before the temperature rise of the first stage. Nevertheless, since preoxidized PAN is hydrophilic, the presence of a large quantity of water within the preforms makes conventional leak-testing by measuring leakage rates impossible, because water vapor is given off continuously.

It is advantageous to proceed as follows.

The empty and cleaned oven is tested for leaks by measuring the rise in its internal pressure after it has been closed and evacuated by pumping through its outlet 62. The oven is considered to be sufficiently leaktight when the rate of pressure rise representative of the rate of leakage into the empty oven lies below a given threshold, e.g. 0.1 kilopascals per hour (kPa/h).

The oven is then opened in order to be filled with preforms. After it has been reclosed, the pressure inside the oven is lowered to a few kPa by pumping through the outlet 62, and members for closing the cover 28 are clamped appropriately.

Nitrogen is then injected into the oven via the duct 32 or 34 in order to raise its pressure to a value that is close to, but lower than, the pressure of the external atmosphere, and the oven is swept with nitrogen which is extracted via the outlet 42, the outlet 62 not being in operation.

The quantity of gaseous oxygen $O_2$ contained in the nitrogen sweeping through the oven is measured by means of the analyzer 98. A suitable analyzer is the appliance sold under the reference "Xentra 4100" by the British supplier Servomex.

The oven is deemed to be suitably leaktight when the oxygen $O_2$ content drops below a given threshold, for example several tens of parts per million (ppm), within a predetermined length of time, e.g. less than 1 h. The valve 97 is then closed and carbonization of the preforms can begin.

Nitrogen is injected into the oven via the duct 34, with the valves 31 and 35 being open and the valve 33 being closed. The outlet 42 is made operational by opening the valve 45, and by switching on at least one of the fans 50a and 50b while also opening the valves on either side thereof. The outlet 62 is not put into operation.

Heating of the oven is started by powering the induction coil. The temperatures measured at the inside wall of the susceptor by the sensors 90a, 90b, 90c, and 90d are transmitted to the control circuit 20 in order to control the power fed to the induction coil in such a manner as to cause temperature rise to take place in compliance with a preestablished temperature-rise profile.

Figure 4:
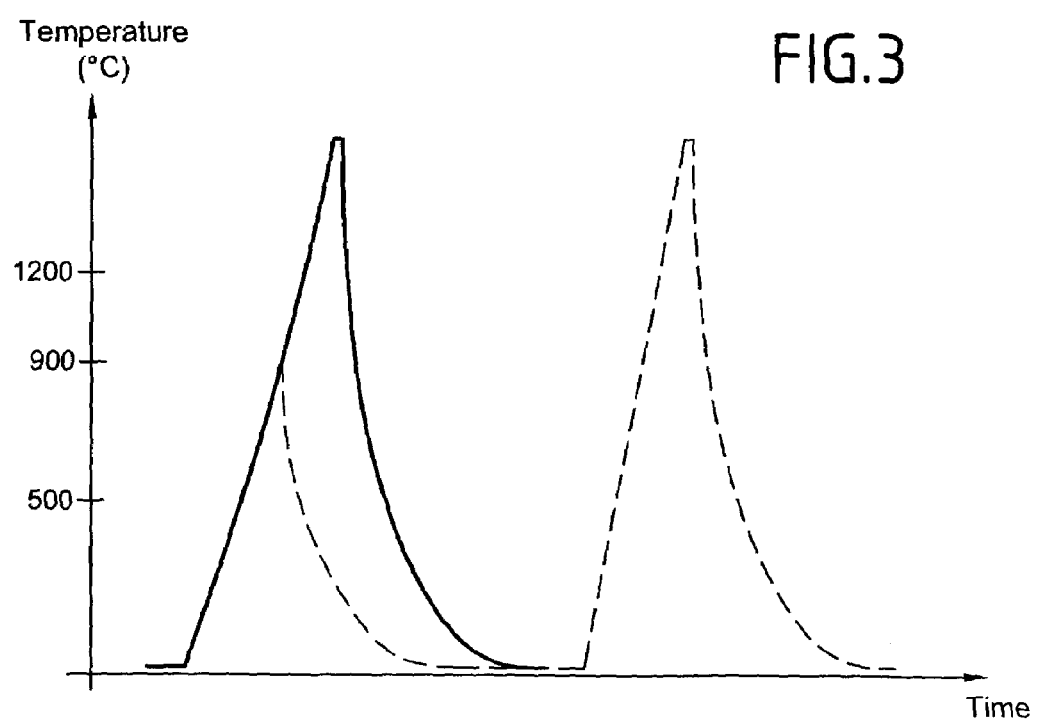
FIG. 4 is a graph showing the variation over time in the temperature to which the oven of the FIG. 1 installation is heated.

One such profile is shown in FIG. 4. In conventional manner, the profile comprises a progressive rise in temperature until the temperature of about 900° C. is reached, the temperature rise including pauses (not shown) for the purpose of keeping control over the chemical transformation of the carbon precursor at temperature levels where said transformation becomes exothermal and where it would otherwise run the risk of running away.

The chemical reaction of transforming the precursor gives off a large volume of gaseous effluent. The effluent makes measuring the heating temperature of the oven by pyrometric observation very difficult or indeed practically impossible, which is why use is made of sensors housed in the oven.

Sweeping the inside of the casing 26 with $N_2$ serves to prevent parasitic deposits forming on the induction coil which is housed inside the casing, which deposits might otherwise lead to the induction coil being damaged. Sweeping therefore preferably takes place at a relatively high rate and is implemented so as to take place throughout the oven.

Since the sensors are isolated from the gaseous effluent flow by being confined within the stick 92, temperature measurement is reliable. By subdividing the oven into a plurality of different heating zones in which temperature can be adjusted independently, it is also possible to ensure that the desired temperature exists at all levels within the oven.

The gaseous effluent extracted through the outlet 42 and containing nitriles, in particular cyanides, is condensed at least in part by being passed through the pot 56 prior to being taken to the burner 86, with combustion gases and the gaseous effluent residue subsequently being exhausted via the chimney 88.

At the end of the first stage of the method, transformation of the precursor into carbon is complete, with the carbon content of the fiber fabric being greater than 95%, and possibly exceeding about 99% or more.

The transition between the first stage and the second stage comprises opening the valves 33 and 77, stopping the fan(s) 50a, 50b while also closing the associated valves, closing the valves 35 and 45, and starting at least one of the pumps 78a, 78b while opening the surrounding valves, the outlet 42 being made inoperative.

The desired low pressure inside the oven is established, with $N_2$ sweeping taking place at a low flow rate, and temperature measurement is switched from the sensors 90a, 90b, 90c, and 90d to the sensors 94a and 94b. The heating of the oven is continued to above the temperature reached at the end of the first stage. It should be observed that changeover from the first stage to the second can also be accompanied by changing the configuration of the heating zones within the oven. The sensors 94a and 94b can be arranged so as to provide information concerning temperature at two different levels within the oven, thus enabling two heating zones to be defined, each of which is associated with two sections of the induction coil, for example.

It should be observed that all of the operations for switching from the first stage to the second can be automated.

The temperature measured by the sensors 94a and 94b is delivered to the control circuit 20 so as to cause the induction coil to be powered so as to make the temperature vary in compliance with a preestablished temperature-rise profile.

One such profile is also shown in FIG. 4. Until the desired temperature has been reached (in this case about 1600° C. for example), this profile comprises a progressive rise in temperature, together with optional pauses. The small quantity of gaseous effluent produced does not interfere with temperature measurement by pyrometric observation.

From a temperature of about 1200° C., the sodium contained in the fiber fabric begins to be released, and it is evacuated together with the gaseous effluent. $CO_2$ is injected into the pipe 64 by opening the valve 69 in order to passivate the Na as soon as it leaves the oven. This makes it possible to avoid potentially dangerous deposition of Na on the walls of the pipe 64. $CO_2$ injection also serves to passivate any sodium compounds which might be contained in the gaseous effluent in sublimed form and which could also form potentially dangerous deposits, and in particular the compound sodium oxide $NaO_2$.

For safety reasons, it should be observed that $CO_2$ injection may be started from the very beginning of the second stage. Such injection is preferably continued at least until the end of the process. The resulting sodium carbonate is collected in the device 70 from which it is easily eliminated at a subsequent stage by being washed in water in situ or by dismantling the baffle plate device 70 and rinsing it in water in a washing vessel (not shown). The gaseous effluent that has been purified of its sodium is taken to the burner 86.

Since the thermocouple sensors 90a, 90b, 90c, and 90d cannot withstand the high temperatures that are reached, they are destroyed thereby. However, since the products of such destruction remain confined within the stick 92 they do not pollute the atmosphere inside the oven. The stick 92 can subsequently be recovered for reuse. Once the second stage has been completed, heating is interrupted and the fiber fabric is allowed to cool in a static atmosphere of $N_2$. $CO_2$ injection can be continued during the initial stages of cooling.

It should be observed that the sodium (or sodium compound such as $NaO_2$) contained in the gaseous effluent can be neutralized by injecting steam instead of $CO_2$ into the pipe 64. It is also possible to envisage injecting both $CO_2$ and steam simultaneously through a common injection nozzle or through two different nozzles.

It should also be observed that passivating sodium by means of $CO_2$ greatly reduces the content of cyanide ions ($CN^-$) in the deposit that is collected in the columns 72 and 74 compared with the content that is observed in the absence of passivation, with this being additional to the safety obtained by avoiding any deposition of sodium.

The dashed-line curve in FIG. 4 shows the temperature profile that would otherwise have been followed using a prior art method, i.e. with the fiber fabric being cooled at the end of the first stage and subsequently loaded into another oven in order to perform the second stage of heat treatment. The saving in time achieved by the method of the invention is considerable, since each of the stages runs over a period of several days, possibly as many as ten days, when the method is performed on an industrial scale.

The above-described method and installation are particularly suitable for making carbon bodies from preoxidized PAN carbon precursor, in particular for making carbon-fiber preforms for manufacturing parts made out of thermostructural composite material.

The preforms are obtained by carbonizing pieces of fabric made out of carbon-precursor fibers that are better than carbon fibers at withstanding textile manufacturing operations. The pieces of fabric can be one-dimensional being in the form of yarns or tows, or two-dimensional such as woven cloth or sheet made up of parallel yarns or tows, or indeed they can be three-dimensional, such as preforms obtained by winding filaments or by stacking, winding, or draping pieces of cloth or sheet to form superposed plies, possibly bonded together by needling or stitching, for example.

Nevertheless, the invention is not limited to this application. It is applicable to bodies made of carbon precursor materials other than preoxidized PAN, in particular bodies containing one or more metals or metallic impurities that need to be eliminated. Examples of such precursors are pitch or phenolic materials or rayons.

In addition to sodium, calcium and/or magnesium can be eliminated by sublimation.

When it is necessary for carbon bodies to present a high degree of purity, it may also be necessary to eliminate metals such as Fe, Ni, and Cr. It is then necessary to perform the second stage of the process up to a temperature which is high enough to cause these metals to evaporate, for example a temperature reaching 2000° C. to 2200° C., or even 2500° C.

The invention claimed is:

1. An industrial method for obtaining a carbon fiber body from a carbon-precursor fiber body made of fibers in a carbon-precursor material, the method comprising:

placing the carbon-precursor fiber body in an oven;

performing in the oven a first stage heating of the carbon-precursor fiber body under a first pressure and up to a first temperature in the range from 750 to 1,100° C. to transform the carbon-precursor material to carbon and obtain the carbon fiber body, wherein a first gaseous effluent containing gaseous carbonization by-products is continuously extracted via a first extractor device;

performing in the oven a second stage healing of the carbon fiber body under a second pressure lower than the first pressure and up to a second temperature to sublime sodium contained in the carbon fiber body, and introducing an inert gas into the oven and continuously extracting a second gaseous effluent containing the inert gas and sublimed sodium via a second extractor device, wherein the second extractor device comprises a shaft having baffle plates to trap solids contained in the second gaseous effluent, the first stage heating and the second stage heating performed sequentially with the carbon fiber body in the oven, wherein transitions between the first stage heating and the second stage heating include switching between extraction of the first gaseous effluent and the second gaseous effluent by switching between the first extractor device and the second extractor device.

2. The method of claim 1, further comprising measuring temperatures via sensors during the first stage heating and the second stage heating, wherein measurement is switched after the first stage heating from at least one first sensor to at least one second sensor.

3. The method of claim 2, wherein the at least one first sensor is a thermocouple type sensor housed in the oven close to a wall thereof and sacrificed during the second stage heating.

4. The method of claim 3, wherein the at least one first sensor is disposed in a confined space to avoid polluting the atmosphere inside the oven as the at least one first sensor is sacrificed.

5. The method of claim 1, wherein transitions between the first stage heating and the second stage heating is automated.

6. The method of claim 1, wherein the oven is leak-tested prior to the first stage heating.

7. The method of claim 6, wherein leak-testing comprises sweeping an inside volume of the oven with a gas and measuring a quantity of gaseous oxygen contained in a gas outlet from the oven after the oven is loaded.

8. The method of claim 1, wherein during the second stage heating, sublimed sodium contained in the second gaseous effluent extracted from the oven is neutralized.

9. The method of claim 8, wherein neutralizing sublimed sodium is performed at least in part via passivation by injecting carbon dioxide into the second gaseous effluent extracted from the oven by the second extractor device.

10. The method of claim 8, wherein neutralizing sublimed sodium is performed at least in part via hydration by injecting steam.

11. The method of claim 1, wherein the fibers in the carbon-precursor material are preoxidized polyacylonitrile fibers.

* * * * *

UNITED STATES PATENT AND TRADEMARK OFFICE
CERTIFICATE OF CORRECTION

PATENT NO. : 7,410,630 B2
APPLICATION NO. : 10/256223
DATED : August 12, 2008
INVENTOR(S) : Jean-Etienne Loncle et al.

It is certified that error appears in the above-identified patent and that said Letters Patent is hereby corrected as shown below:

Column 1, line 45, "nitrites" should read --nitriles--;

Column 5, line 22, "collecting nitrites," should read --collecting nitriles,--;

Column 5, line 22, "heavy nitrites" should read --heavy nitriles;--; and

Column 10, claim 1, line 54 "healing" should read --heating--.

Signed and Sealed this
Eighteenth Day of October, 2011

David J. Kappos
*Director of the United States Patent and Trademark Office*